US008857793B2

(12) United States Patent
Kim

(10) Patent No.: US 8,857,793 B2

(45) Date of Patent: Oct. 14, 2014

(54) BUTTERFLY VALVE HAVING FUNCTION OF MAINTAINING SEALING PERFORMANCE UNDER LOW AND HIGH TEMPERATURES

(75) Inventor: Man Young Kim, Gyeonggi-Do (KR)

(73) Assignee: Seokwang Mfg. Co., Ltd. (KR)

( * ) Notice: Subject to any disclaimer, the term of this patent is extended or adjusted under 35 U.S.C. 154(b) by 248 days.

(21) Appl. No.: 13/277,311

(22) Filed: Oct. 20, 2011

(65) Prior Publication Data

US 2012/0273708 A1 Nov. 1, 2012

(30) Foreign Application Priority Data

Apr. 26, 2011 (KR) ........................ 10-2011-0038743

(51) Int. Cl.

| | |
|---|---|
| ***F16K 25/00*** | (2006.01) |
| ***F16K 1/22*** | (2006.01) |
| ***F16K 1/42*** | (2006.01) |
| ***F16K 1/226*** | (2006.01) |

(52) U.S. Cl.

CPC .................................... *F16K 1/2263* (2013.01)

USPC ............ 251/307; 251/164; 251/173; 251/362

(58) Field of Classification Search

USPC ......... 251/173, 192, 170, 164, 305–307, 359, 251/360, 362

See application file for complete search history.

(56) References Cited

U.S. PATENT DOCUMENTS

| | | | | |
|---|---|---|---|---|
| 2,059,656 | A * | 11/1936 | Ring | 210/535 |
| 2,083,154 | A * | 6/1937 | Kinzie et al. | 251/307 |
| 3,666,236 | A * | 5/1972 | Gachot | 251/306 |
| 3,834,663 | A * | 9/1974 | Donnelly | 251/173 |
| 3,997,142 | A * | 12/1976 | Broadway | 251/307 |
| 4,410,163 | A * | 10/1983 | Scobie et al. | 251/306 |
| 4,763,877 | A * | 8/1988 | Kennedy | 251/362 |
| 5,158,265 | A * | 10/1992 | Miyairi | 251/305 |
| 5,178,364 | A * | 1/1993 | Garrigues et al. | 251/306 |
| 5,871,203 | A * | 2/1999 | Gasaway | 251/306 |
| 6,149,130 | A * | 11/2000 | Thurston et al. | 251/173 |
| 6,189,860 | B1 * | 2/2001 | Sato et al. | 251/306 |
| 2003/0062500 | A1 * | 4/2003 | Eggleston et al. | 251/306 |

* cited by examiner

*Primary Examiner* — John K Fristoe, Jr.

*Assistant Examiner* — Hailey K Do

(74) *Attorney, Agent, or Firm* — Ostrolenk Faber LLP

(57) ABSTRACT

Disclosed is a butterfly valve capable of controlling a flow of a fluid according to a rotation of a disk. The butterfly valve includes a body provided with an inner space having two open ends; a disk unit having a disk rotatably installed at the inner space, and configured to selectively open and close the inner space according to a rotation of the disk; a first seat portion protruding from an outer circumferential surface of the disk; a second seat portion protruding from an inner circumferential surface of the body, and arranged to face the first seat portion; and a sealing unit mounted to the body, and formed to contact the first and second seat portions such that a gap between the outer circumferential surface of the disk and the inner circumferential surface of the body is sealed. Under this configuration, the butterfly valve may have an enhanced reliability under low and high temperatures and a high pressure.

8 Claims, 4 Drawing Sheets

BUTTERFLY VALVE HAVING FUNCTION OF MAINTAINING SEALING PERFORMANCE UNDER LOW AND HIGH TEMPERATURES

CROSS-REFERENCE TO RELATED APPLICATION

Pursuant to 35 U.S.C. §119(a), this application claims the benefit of earlier filing date and right of priority to Korean Application No. 10-2011-0038743, filed on Apr. 26, 2011, the contents of which is incorporated by reference herein in its entirety.

BACKGROUND OF THE INVENTION

1. Field of the Invention

This specification relates to a butterfly valve capable of controlling a flow of a fluid according to a rotation of a disk disposed in a valve body.

2. Background of the Invention

Generally, valves are installed at parts of a piping system formed by pipes, etc. which form a flow passage of a fluid. These valves serve to control a flow of a fluid to be stopped or to be maintained.

Among these valves, a butterfly valve is configured to open and close a pipe according to a rotation of a disk installed in a valve body. More concretely, a sealing device (sealing unit) is arranged to block a gap between an opening and closing member (disk) and a housing of the butterfly when fluid flow is in a stopped state.

The sealing unit is installed at the housing in a contacted state to the opening and closing member with an initially preset pressure. However, the sealing unit may be abraded according to lapses of time. Accordingly, a sealing degree has to be controlled. Furthermore, a closely contacted state between the sealing unit and the disk should not be loosened due to a thermal deformation occurring when a fluid has a high temperature. When a fluid has a high pressure, the closely contacted state between the sealing unit and the disk should be maintained more stably. To satisfy these conditions, a new method may be considered.

SUMMARY OF THE INVENTION

Therefore, an aspect of the detailed description is to provide a butterfly valve capable of controlling a sealing state in a different manner from the conventional art.

Another aspect of the detailed description is to provide a butterfly valve capable of having an enhanced operation reliability under low and high temperatures, a high pressure, etc.

Still another aspect of the detailed description is to provide a butterfly valve including a sealing unit and a control unit, having simple assembly processes, and capable of being easily fabricated.

To achieve these and other advantages and in accordance with the purpose of this specification, as embodied and broadly described herein, there is provided a butterfly valve having a function of maintaining a sealing performance under low and high temperatures, the butterfly valve comprising: a body provided with an inner space having two open ends; a disk unit having a disk rotatably installed at the inner space, and configured to selectively open and close the inner space according to a rotation of the disk; a first seat portion protruding from an outer circumferential surface of the disk; a second seat portion protruding from an inner circumferential surface of the body, and arranged to face the first seat portion; and a sealing unit mounted to the body, and formed to contact the first and second seat portions such that a gap between the outer circumferential surface of the disk and the inner circumferential surface of the body is sealed.

According to one embodiment of the present invention, the sealing unit may include a first contact portion inclined with respect to a central line of the body, and contacting the first seat portion; and a second contact portion inclined with respect to a central line of the body in an opposite direction to the first contact portion, and contacting the second seat portion.

The sealing unit may be provided with a sealing body portion formed in a ring shape. The first contact portion may be extending from the sealing body portion in the form of a cantilever, and the second contact portion may be formed on an outer circumferential surface of the sealing body portion. The first and second contact portions may be formed to be inclined toward a direction to press the first and second seat portions by a pressure of a fluid which flows along the inner space.

According to another embodiment of the present invention, the first and second seat portions may include first and second metal seats formed of metallic materials, respectively.

The first and second metal seats may be formed such that contact points thereof with the first and second contact portions are arranged at positions corresponding to each other in a radius direction of the body. The first and second metal seats may be fixed to the disk and the body, respectively, in a welding manner.

According to still another embodiment of the present invention, the butterfly valve may further comprise a control unit. The control unit may be configured to control a position of the sealing unit such that the sealing unit controls pressed degrees of the first and second seat portions.

The control unit may include a fixing portion mounted to the body, and a control screw coupled to the sealing unit through the fixing portion so as to control the pressed degrees. An end of the first contact portion may be mounted to one surface of the fixing portion. The body may be provided with a vertical surface perpendicular to an inner circumferential surface of the body, and a horizontal surface having an insertion groove and extending from the vertical surface. The fixing portion may be mounted to the vertical surface and the horizontal surface. A part of a ring holder may be inserted into the insertion groove such that the fixing portion is fixed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
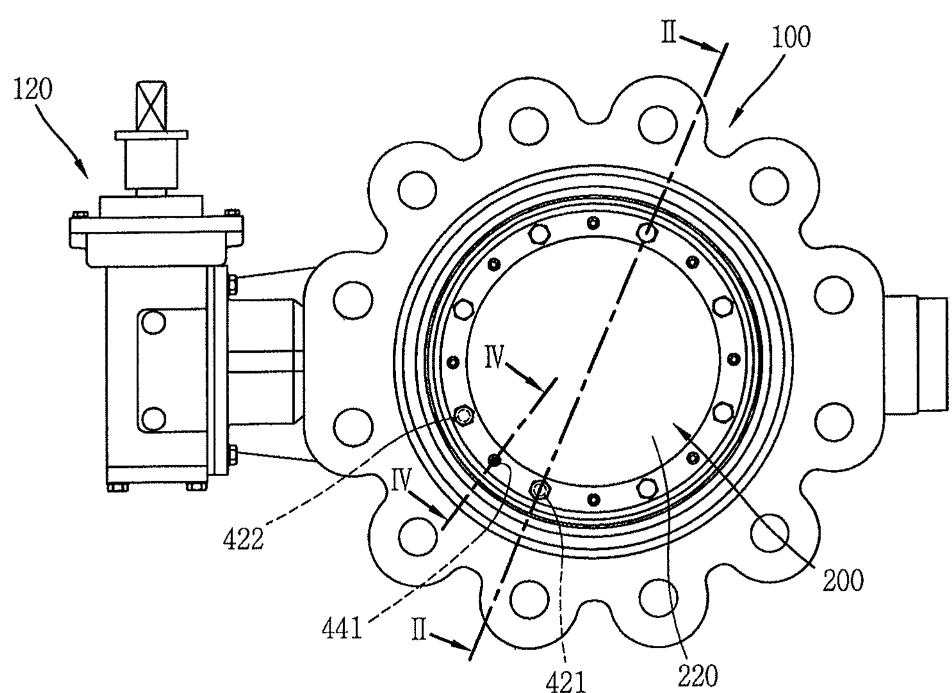
FIG. 1 is a side sectional view of a butterfly valve according to a first embodiment of the present invention.

Description will now be given in detail of the exemplary embodiments, with reference to the accompanying drawings. For the sake of brief description with is reference to the drawings, the same or equivalent components will be provided with the same reference numbers, and description thereof will not be repeated.

Hereinafter, a butterfly valve having a function of maintaining a sealing performance under low and high temperatures according to the present invention will be explained in more details with reference to the attached drawings.

The same or similar reference numerals will be given to the same or similar parts in different embodiments, and their detailed explanation will be omitted. The singular expression used in the specification of the present invention may include the meaning of plurality unless otherwise defined.

FIG. 1 is a side sectional view of a butterfly valve according to a first embodiment of the present invention.

Referring to FIG. 1, a body 100 of a butterfly valve is formed in an approximate cylindrical shape. A fluid may flow through an inner space 110 (refer to FIG. 2) of the cylindrical body 100. More concretely, the inner space 110 forms a flow passage of a fluid, and two ends of the valve body 100 are open so that the flow passage can be consecutively extending.

A disk unit 200 configured to open and close a flow passage is installed at the inner space 110. The disk unit 200 is configured to open and close a flow passage by using a disk 200 rotatably mounted to the valve body 100. For instance, the disk 220 is connected to an opening and closing device 120, and is to rotated at the inner space 110 by manipulating the opening and closing device 120. A plate for supporting the body 100 on the ground, etc. may be installed below the body 100.

Figure 2:
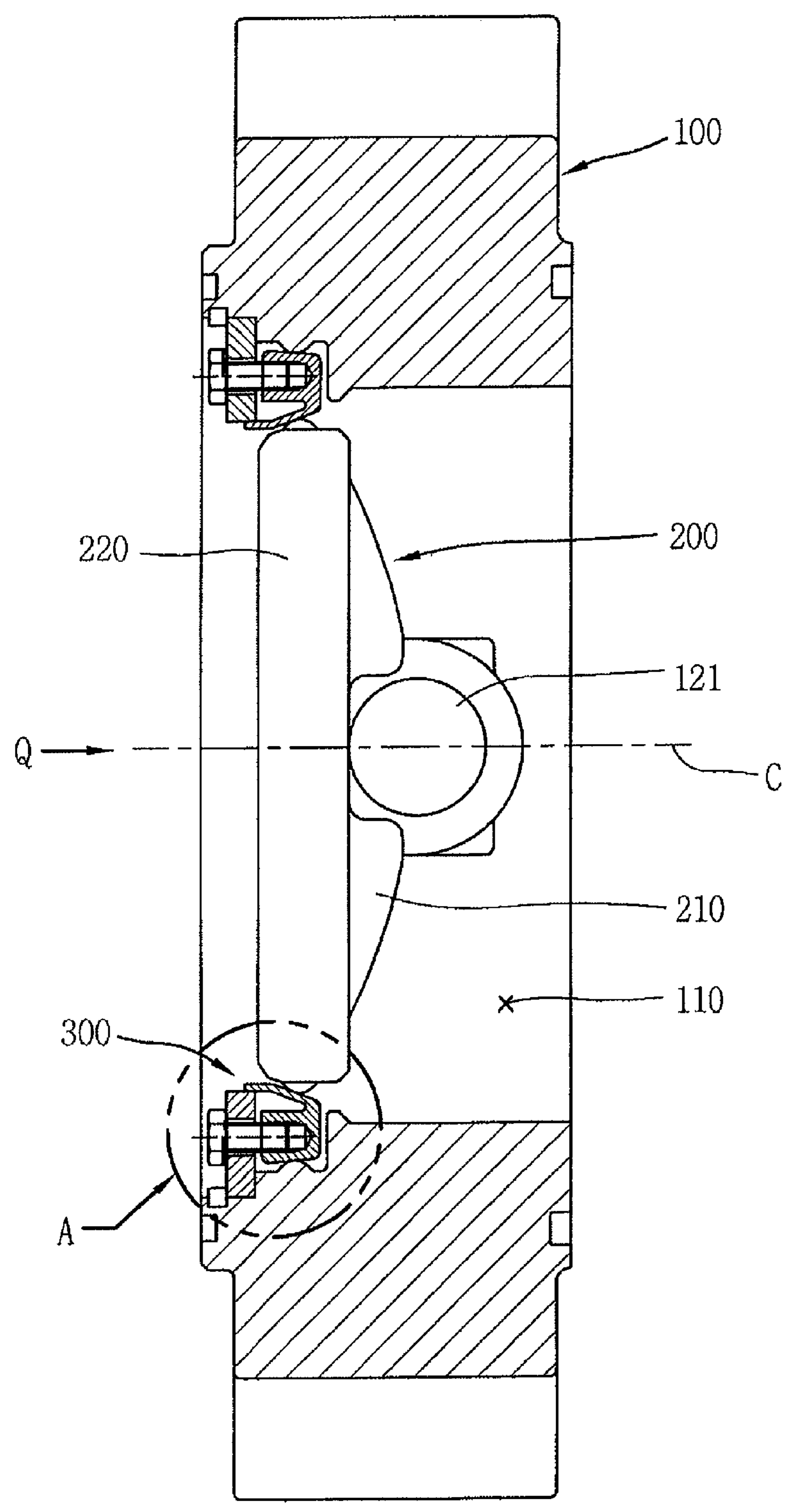
FIG. 2 is a sectional view taken along line 'II-II' in FIG. 1.

FIG. 2 is a sectional view taken along line in FIG. 1.

Referring to FIG. 2, a rotation shaft 121 of the opening and closing device 120 is connected to a supporting plate 210 of the disk unit 200. To the supporting plate 210, connected is the disk 220 for opening and closing a flow passage formed at the inner space 110 according to a rotated state at the inner space 110. The disk 220 is configured to close the flow passage (closed state, refer to FIG. 2), or to open the flow passage by being rotated centering around the rotation shaft 121 (open state). In order to completely open the flow passage, the disk 220 has to be rotated by approximately 90° from the current state.

A sealing unit 300 is arranged on an inner circumferential surface of the body which forms the inner space 110, thereby sealing a gap between an outer circumferential surface of the disk and an inner circumferential surface of the housing. More concretely, the sealing unit 300 is coupled to an inner circumferential surface of the body 100 with supporting the disk 220. This may prevent a fluid from leaking to a gap between the body 100 and the disk 220 in a closed state.

Hereinafter, a leakage preventing mechanism relating to the sealing unit 300 will be explained in more details with reference to FIGS. 3 and 4.

Figure 3:
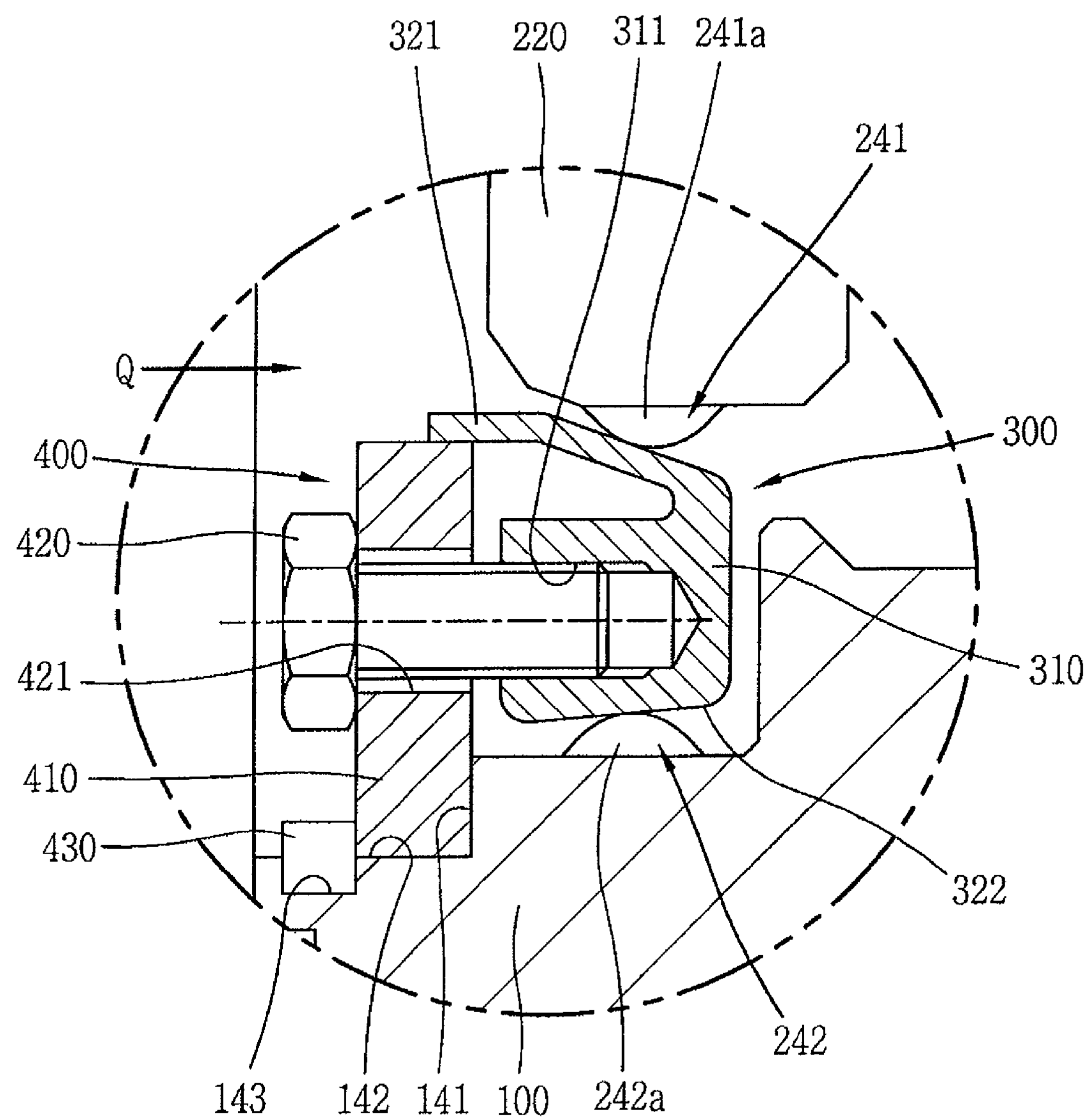
FIG. 3 is an enlarged sectional view of a part of 'A' in FIG. 2.
Figure 4:
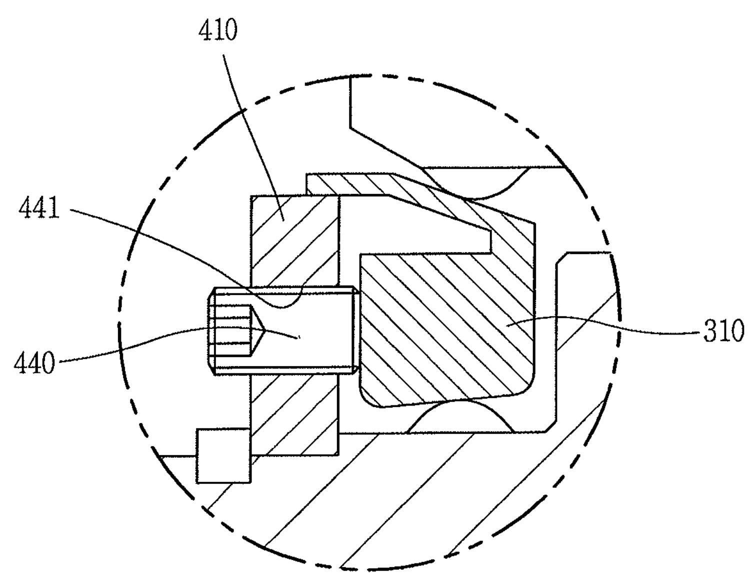
FIG. 4 is an enlarged sectional view taken along line 'IV-IV' in FIG. 1.

FIG. 3 is an enlarged sectional view of a part of 'A' in FIG. 2, and FIG. 4 is an enlarged sectional view taken along line 'IV-IV' in FIG. 1.

Referring to FIG. 3, a first seat portion 241 is protruding from an outer circumferential surface of the disk 220. The first seat portion 241 is formed in a circumferential direction of the disk 220, and is configured to contact or to be separated from the sealing unit 300 according to a rotation of the disk 220.

A second seat portion 242 is protruding from an inner circumferential surface of the body 100 at a position facing the first seat portion 241. The second seat portion 242 is formed in a circumferential direction of the body 100, and is configured to contact the sealing unit 300 at a fixed position.

The first seat portion 241 and the second seat portion 242 may be formed of a metallic material or a rubber, etc. When the first seat portion 241 and the second seat portion 242 are formed of a metallic material, they may be integrally formed with the disk 220 and the body 100. More concretely, the first seat portion 241 and the second seat portion 242 include metal seats 241*a* and 242*a* formed of a metallic material, respectively. Each of the first and second metal seats 241*a* and 242*a* is provided with a semi-circular sectional surface. Here, the semi-circular shape may be formed in correspondence to an exponential curve. Alternatively, the first and second metal seats 241*a* and 242*a* may be fixed to the disk 220 and the body 100 by an overlaid welding, respectively.

Referring to FIG. 3, the sealing unit 300 is configured to contact the first and second seat portions 241 and 242, respectively so as to seal a gap between an outer circumferential surface of the disk 220 and an inner circumferential surface of the body 100. For this, the sealing unit 300 includes a sealing body portion 310, a first contact portion 321 and a second contact portion 322.

The sealing body portion 310 forms a main body of the sealing unit, and is formed of a metallic material. The sealing body portion 310 may be formed in a circular-arc shape or a ring shape so as to be disposed in a circumferential direction of an inner circumferential surface of the body 100. The first contact to portion 321 and the second contact portion 322 may be disposed at an inner circumference side and an outer circumferential side of the circular-arc shape or the ring shape, respectively.

The first contact portion 321 is inclined with respect to a center line (C) of the body, and is configured to contact the first seat portion 241. For instance, the first contact portion 321 is extending from the sealing body portion 310 in the form of a cantilever. That is, a fixed end of the first contact portion 321 is connected to the sealing body portion 310, and a free end thereof is configured to be deformed as the first seat portion 241 presses the first contact portion 321.

More concretely, as one surface of the sealing body portion 310 is recessed, a cantilever having a thin thickness is formed. The cantilever is a part which elastically contacts the disk 220, and has a larger elastic deformation amount than any other parts due to its thin thickness.

The second contact portion 322 is inclined with respect to the center line (C) of the body (refer to FIG. 2) in an opposite direction to the first contact portion 321, and is configured to contact the second seat portion 242. As shown, the second contact portion 322 is formed on an outer circumferential surface of the sealing body portion 310. That is, the second contact portion 322 may be formed as the outer circumferential surface of the sealing body portion 310 is inclined in an opposite direction to the first contact portion 321.

Generally, an O-ring formed of a synthetic resin is used to prevent leakage. However, the O-ring may be loosened or burnt (may have an increased diameter) at a high-temperature to have a difficulty in preventing leakage. The present invention is not provided with the O-ring. Accordingly, the conventional problem of leakage may not occur in the present invention. Furthermore, since the first and second metal seats 241*a* and 242*a* are formed of a metallic material, leakage due to a thermal deformation may be prevented.

The sealing unit 300 is configured to press the disk 220 with a different intensity according to a pressure of a fluid which flows along the inner space 110. More concretely, when a fluid has a large pressure, the sealing unit 300 is configured to press or to contact the disk 220 with a larger intensity.

For instance, the first and second contact portions 321 and 322 are formed to be inclined in a direction to press the first and second seat portions 241 and 242 by a pressure of a fluid which flows along the inner space of the body. More concretely, the first and second contact portions 321 and 322 are inclined so as to be approaching to each other along a direction of fluid flow (Q). When the disk 220 is in a closed state, the first and second contact portions 321 and 322 are fitted to a space between the first and second seat portions 241 and 242 like a wedge by a fluid pressure applied to the sealing unit 300. This configuration may implement a mechanism for preventing leakage more efficiently when a high pressure of a fluid is applied to the sealing unit 300.

The first and second seat portions 241 and 242, more concretely, the first and second metal seats 241*a* and 242*a* are formed so that contact points thereof with the first and second contact portions 321 and 322 are arranged at positions corresponding to each other in a radius direction of the body. More concretely, the contact points may be arranged on the same line, and the same line may be perpendicular to the center line (C) of the body. Under this configuration, the sealing unit 300 may have a more enhanced sealing function.

The sealing unit 300 is formed to have a controllable position along the center line (C) of the body. This may be implemented by a control unit 400. The control unit 400 controls a position of the sealing unit 300, thereby controlling pressed degrees of the first and second seat portions 241 and 242 by the sealing unit 300.

The control unit 400 includes a fixing portion 410 and a control screw 420.

The fixing portion 410 is mounted to the body, and is formed to have a ring shape. The control screw 420 of the fixing portion 410 is coupled to the sealing unit 300 through the fixing portion 410 so as to control the pressed degrees. A through hole 421 for passing the control screw 420 therethrough may be formed at the fixing portion 410.

At the body 100, formed are a vertical surface 141 perpendicular to the inner circumferential surface of the body to which the second seat portion 242 is fixed, and a horizontal surface 142 extending from the vertical surface 141. The horizontal surface 142 is provided with an insertion groove 142, and a part of a ring holder 430 is inserted into the insertion groove, 143 so that the fixing portion 410 can be fixed. One or more parts of the ring holder 430 are protruding from the horizontal surface 142.

The ring holder 430 is formed so that two ends facing each other can be approaching to each other or spacing from each other. That is, two ends of the ring holder 430 having been inserted into the insertion groove 143 may be spacing from each other for an increased diameter. Once a diameter of the ring holder 430 is increased, the ring holder 430 may be fixed in that state. The ring holder 430 may be implemented as a 'C' ring, or an 'E' ring, or a quadrangular ring, etc.

A mounting portion for mounting the fixing portion 410 is formed as the vertical surface 141 and the horizontal surface 142 are combined with each other. The fixing portion 410 is arranged at the mounting portion so that two surfaces thereof perpendicular to each other can be supported by the vertical surface 141 and the horizontal surface 142. Under this state, the fixing portion 410 is fitted into a space between the ring holder 430 and the vertical surface 141. This may allow the fixing portion 410 to be fixed.

The end of the first contact portion 431 is mounted to one surface of the fixing portion 410. For instance, one surface of the fixing portion 410 (an opposite surface to a surface mounted to the horizontal surface) is configured to face a free end of the first contact portion 431 so as to limit a deformation amount of the first contact portion 431. Once the first contact portion is deformed in a direction spacing from the disk 220, the fixing portion 410 limits a deformation amount of the first contact portion.

A screw groove 311 where a screw thread is formed is arranged at the sealing body portion 310. The control screw 420 having passed through the fixing portion 410 is screw-coupled to the screw groove 311 so as to control a position of the sealing unit 300.

Referring to FIG. 4, at the fixing portion 410, formed is a pressing screw 440 for supporting one surface of the sealing body portion 310 so as to press the sealing body portion 310 in a direction spacing from the fixing portion 410. Unlike the control screw 420 (hexagonal head bolt), the pressing screw 440 is implemented as a socket head bolt. However, the present invention is not limited to this.

A screw hole 441 is formed between neighboring through holes 421 and 422 of the fixing portion 410 (refer to FIG. 1). The pressing screw 440 and the control screw 420 are arranged in a sequential manner, and the pressing screw 440 is configured to support the sealing body portion 310 through the screw hole 441.

Once the control screw 420 is tightened in a state that the pressing screw 440 has been loosened (in a state that the pressing screw 440 has moved to a direction spacing from the sealing body portion), the sealing body portion 310 is moved toward the fixing portion 410. This may allow inclined surfaces of the contact portions 321 and 322 to contact the seat portions 241 and 242 in a more smooth manner.

On the other hand, once the pressing screw 440 is tightened in a state that the control screw 420 has been loosened (in a state that the control screw 420 has moved to a direction approaching to the sealing body portion), the sealing unit 300 is moved so that the inclined surfaces of the contact portions 321 and 322 can contact the seat portions 241 and 242 more closely. The position of the sealing unit 300 is changed by the control screw 420 and the pressing screw 440, thereby controlling pressed degrees of the seat portions 241 and 242.

The butterfly valve according to the present invention may have the following advantages.

Firstly, the butterfly valve implements a leakage preventing mechanism capable of maintaining a sealing function under a high temperature by the first and second seat portions. Especially, since the first and second seat portions are formed of a metallic material, may not be required an elastic sealing member (O-ring, etc.) formed of a non-metallic material and having a lowered sealing function under a high temperature. Accordingly, the butterfly valve of the present invention may prevent leakage due to a thermal deformation of an O-ring, etc.

Secondly, since the first and second contact portions are inclined in opposite directions, a sealing function is performed more effectively under a high to pressure.

Thirdly, owing to the sealing unit having the first and second contact portions, may be implemented a compact structure having an enhanced reliability, a small number of components, and simplified assembly processes.

The foregoing embodiments and advantages are merely exemplary and is are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A butterfly valve, comprising:

a body defining an inner space having two open ends and an inner circumferential surface;

a disk unit having a disk rotatably installed at the inner space, and configured to selectively open and close the inner space according to a rotation of the disk, said disk having an outer circumferential surface facing said inner circumferential surface;

a first seat portion protruding from a portion of the outer circumferential surface of the disk;

a second seat portion protruding from the inner circumferential surface of the body, and arranged to radially face the first seat portion; and a sealing unit mounted to the body, and formed to contact the first and second seat portions such that a gap between the outer circumferential surface of the disk and the inner circumferential surface of the body is sealed, wherein the sealing unit comprises:

a first contact portion inclined with respect to a central line of the body, located at one side of the sealing unit, and contacting the first seat portion; and a second contact portion inclined with respect to the central line of the body in a direction opposite to the first contact portion, located at an opposite side of the sealing unit, and contacting the second seat portion.

2. The butterfly valve of claim 1, wherein the sealing unit is provided with a sealing body portion formed in a ring shape, wherein the first contact portion is extending from the sealing body portion in the form of a cantilever, and the second contact portion is formed on an outer circumferential surface of the sealing body portion.

3. The butterfly valve of claim 1, wherein the first and second contact portions are formed to be inclined toward a direction to press the first and second seat portions by a pressure of a fluid which flows along the inner space.

4. The butterfly valve of claim 1, further comprising a control unit configured to control a position of the sealing unit such that the sealing unit controls pressed degrees of the first and second seat portions, wherein the control unit comprises:

a fixing portion mounted to the body; and a control screw coupled to the sealing unit through the fixing portion so as to control the pressed degrees.

5. The butterfly valve of claim 4, wherein the body is provided with a vertical surface perpendicular to an inner circumferential surface of the body, and a horizontal surface having an insertion groove and extending from the vertical surface, wherein the fixing portion is mounted to the vertical surface and the horizontal surface, and a part of a ring holder is inserted into the insertion groove such that the fixing portion is fixed.

6. The butterfly valve of claim 1, wherein the first and second seat portions comprise first and second metal seats formed of metallic materials, respectively.

7. The butterfly valve of claim 6, wherein the first and second metal seats are formed such that contact points thereof with the first and second contact portions are arranged at positions corresponding to each other in a radius direction of the body.

8. The butterfly valve of claim 6, wherein the first and second metal seats are fixed to the disk and the body, respectively, in a welding manner.

* * * * *